July 9, 1935.  F. J. FUSS  2,007,853
TRACTOR WHEEL
Filed May 15, 1934  2 Sheets-Sheet 2
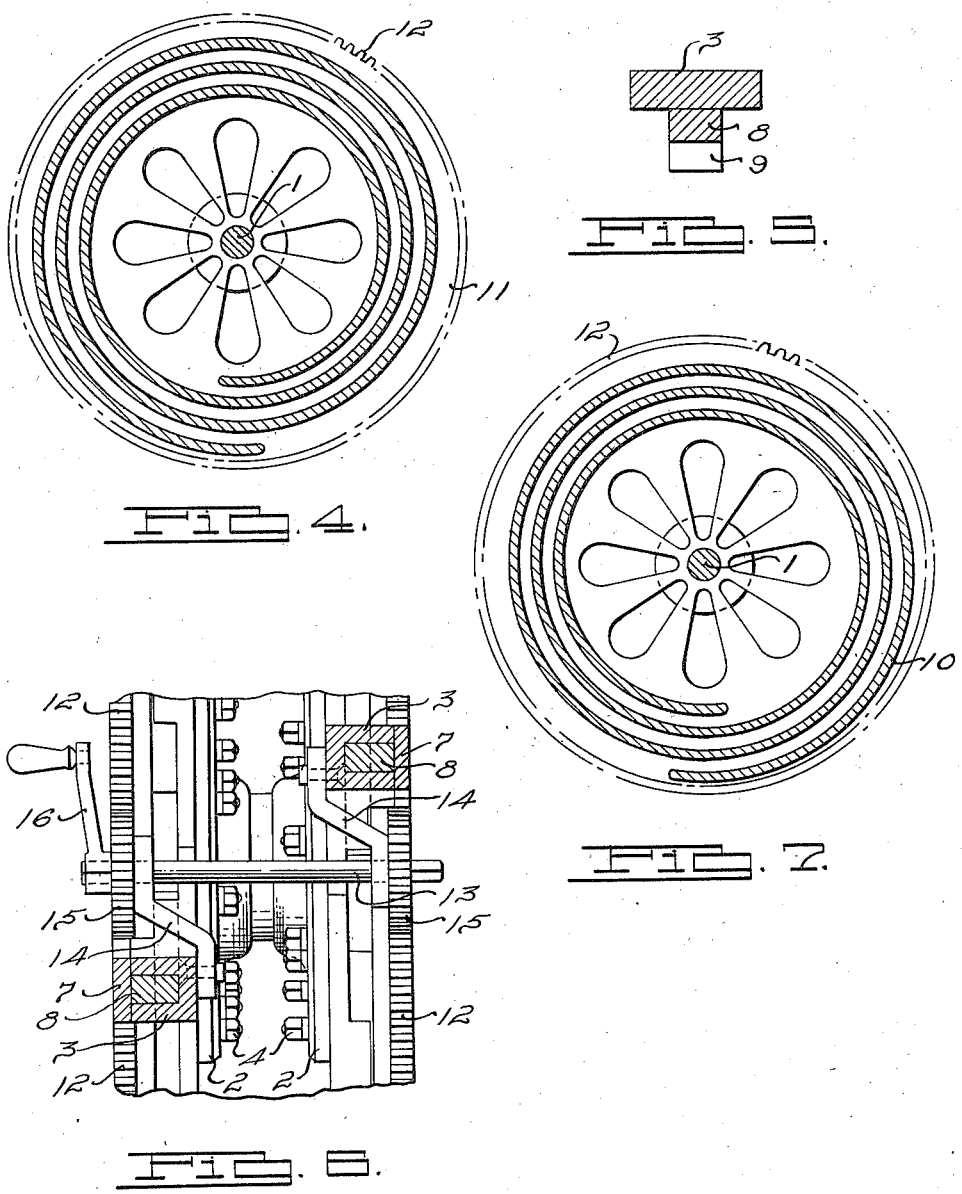
INVENTOR.
Fredrick J. Fuss.
BY
ATTORNEY.

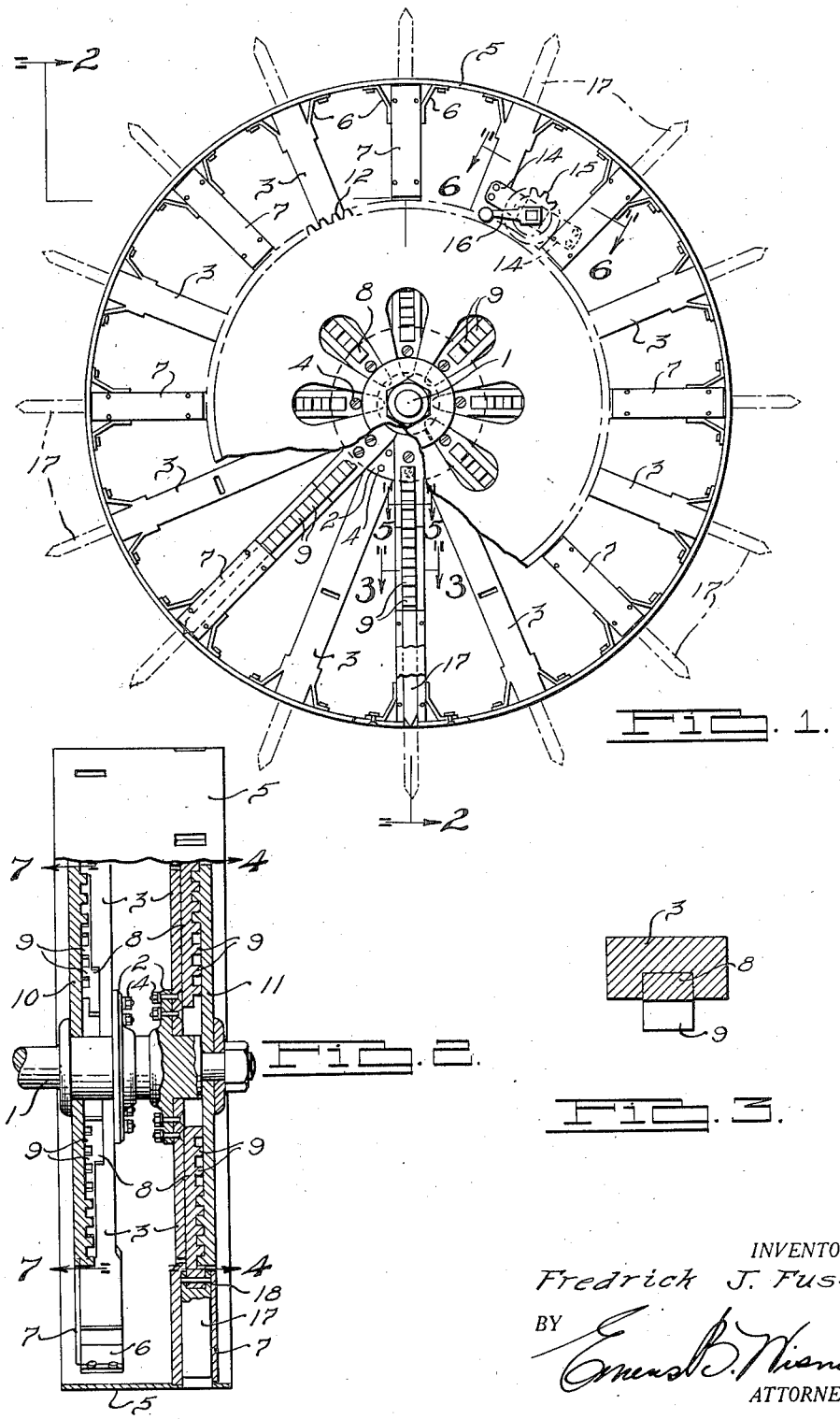

Patented July 9, 1935

2,007,853

UNITED STATES PATENT OFFICE 2,007,853

TRACTOR WHEEL

Fredrick J. Fuss, Detroit, Mich.

Application May 15, 1934, Serial No. 725,697

2 Claims. (Cl. 301—46)

This invention relates to tractor wheels and the object of the invention is to provide a tractor wheel having radial bars which may be moved outwardly or inwardly in relation to the wheel.

Another object of the invention is to provide a tractor wheel having bars which are movable radially and which may be adjusted in position to extend from the wheel to a greater or less extent.

Another object of the invention is to provide a tractor wheel of the character described in which all of the bars may be moved outwardly simultaneously or retracted simultaneously.

A further object of the invention is to provide a tractor wheel in which all of the bars are moved to the same extent upon inward or outward adjustment thereof.

These objects and the several novel features of the invention are hereinafter more fully described and claimed and the preferred form of construction by which these objects are attained is shown in the accompanying drawings in which—

Fig. 1 is an elevation of a tractor wheel partly broken away to show the construction.

Fig. 2 is a section taken on line 2—2 of Fig. 1.

Fig. 3 is an enlarged section taken on line 3—3 of Fig. 1.

Fig. 4 is a view taken on line 4—4 of Fig. 2 showing the face of one of the worm plates.

Fig. 5 is a section taken on line 5—5 of Fig. 1.

Fig. 6 is an enlarged section taken on line 6—6 of Fig. 1.

Fig. 7 is a view taken on line 7—7 of Fig. 2 showing the face of the other worm plate.

As shown in Fig. 2, a hub 1 is provided having a pair of flanges 2 near the center. A series of spokes in the form of housings 3 are secured to the flanges 2 by means of the bolts 4. At the outer end, each spoke housing is secured to the rim 5 by means of the brackets 6 shown in Fig. 1 and each spoke housing is provided with an open side which is covered by the cover plate 7. These spoke housings are arranged in two series, one for each side of the wheel and the open sides of the spoke housings, on each side of the wheel, face outwardly as will be understood from Figs. 1 and 2. Slidably mounted in each spoke housing is a radially movable bar 8 and each bar 8 is provided with a series of teeth 9, shown in Figs. 1 and 2. A pair of worm plates 10 and 11 are rotatably mounted on the hub 1 and these two worm plates are each provided with a spiral worm or rib, as shown in Figs. 4 and 7. These plates are so mounted that the spiral worm or rib engages in the teeth 9 of the bars 8, as will be understood from Fig. 2, and the worms in these plates are reversed, as will be understood from Figs. 4 and 7. Each worm plate is provided with teeth 12 at the outer edge, as will be understood from Figs. 1, 4, 6 and 7, and, as shown in Fig. 6, a shaft 13 is provided which is rotatably mounted in the brackets 14 secured to adjacent spoke housings 3. A pair of pinion gears 15 are secured to the shaft 13 and a crank 16 is secured to this shaft whereby the pinion gears 15 may be rotated to turn the worm plates on the hub. At the outer end, each bar 8 is pivotally connected to a traction lug 17 by means of the pin 18, shown at the bottom of Fig. 2.

To operate the device, the operator turns the crank 16 thus turning the shaft 13 and pinion gears 15 which are in mesh with the teeth 12 of the worm plates. This turns the worm plates causing the worms thereon to feed the bars 8 and traction lugs outwardly as indicated in dotted lines in Fig. 1. When the traction lugs are moved outwardly to the desired extent, the rotation of the shaft 13 is stopped by releasing the crank 16 which will remain in position. The gears 15 then hold the worm plates in fixed relation with the wheel so that the wheel may be rotated and the traction lugs will be firmly supported in extended position by the worm plates. If it is desired to retract the traction lugs, it is only necessary to rotate the crank 16 in the reverse direction thus drawing the toothed bars and traction lugs inwardly. It will be noted that the traction lugs may be extended only slightly or to a greater extent, as desired, as the amount of extension of the lugs may be accurately adjusted by rotation of the crank and worm plates. If any toothed bar 8 or traction lug becomes broken, the entire spoke housing may be removed by disengaging the bolts which secure the brackets 6 to the rim and disengaging the bolts 4 which secure the respective spoke housing to the hub flange 2. By providing a squared end on each end of the shaft 13, the crank 16 may be removed when not in use and may be used on either end of the shaft 13 on the interior or exterior side of the wheel.

From the foregoing description it becomes evident that the device is very simple and efficient in operation, will not easily get out of order, may be very quickly adjusted to move the lugs out to the desired extent and provides a device which accomplishes the objects described.

Having thus fully described my invention, its utility and mode of operation, what I claim and desire to secure by Letters Patent of the United States is—

1. In a tractor wheel, a hub member, a rim member, two series of spoke housings extending radially between the hub and rim members and secured thereto, a toothed bar movable longitudinally in each spoke housing, the bars being arranged in series on opposite sides of the wheel, a worm plate rotatably mounted on each side of the wheel and meshing with the toothed bars of the respective series, the worms on the two plates being in spiral form and being reversed on one plate in relation to the other, a traction lug connected to the outer end of each bar and movable through the rim member, the outer periphery of each worm plate being provided with gear teeth, a pair of brackets each connected to a pair of adjacent spoke housings, a shaft rotatably mounted in the brackets and a pair of pinions secured to the shaft and meshing with the teeth of the respective worm plates, the arrangement being such that rotation of the shaft will turn both worm plates in the same direction.

2. In a tractor wheel, a hub member, a rim member, two series of radial spoke housings connecting the hub and rim members, a toothed bar movable longitudinally in each spoke housing and provided with a traction lug at the outer end, the toothed bars being positioned in the housings so that the teeth of each series of bars face outwardly, a worm plate for each series of toothed bars rotatably mounted on the hub in the exterior of the respective toothed bars and having a spiral worm meshing with the teeth of the respective series of bars, the spiral worm on one worm plate being in a reverse spiral to the spiral worm of the other worm plate and manually operable means for turning the worm plates to an equal extent in either direction.

FREDRICK J. FUSS.